W. KACHIN.
STRAW-CUTTER.
No. 191,288.	Patented May 29, 1877.
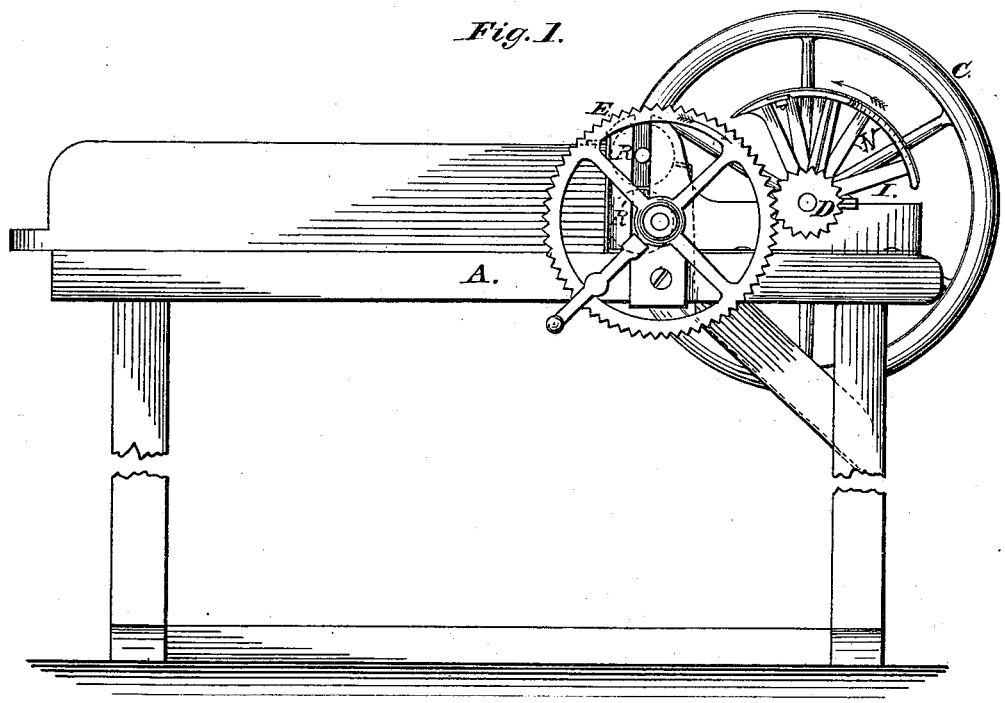
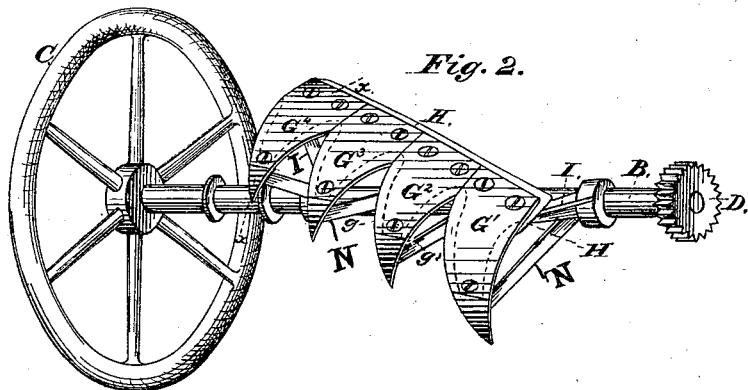
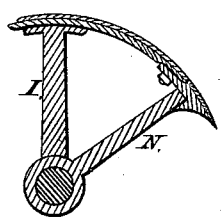
Witnesses:
A. W. Bright
F. O. M'Cleary
Inventor:
Wm Kachin.
By Leggett & Leggett.

UNITED STATES PATENT OFFICE.

WILLIAM KACHIN, OF CLEVELAND, OHIO.

IMPROVEMENT IN STRAW-CUTTERS.

Specification forming part of Letters Patent No. 191,288, dated May 29, 1877; application filed April 2, 1877.

*To all whom it may concern:*

Be it known that I, WILLIAM KACHIN, of Cleveland, in the county of Cuyahoga and State of Ohio, have invented certain new and useful Improvements in Straw-Cutters; and I do hereby declare the following to be a full, clear, and exact description of the invention, such as will enable others skilled in the art to which it pertains to make and use it, reference being had to the accompanying drawings, which form part of this specification.

My invention relates to straw-cutters; and consists in a knife formed of a series of teeth, each tooth curved to the arc of a circle, and secured to an axle at a proper distance therefrom by suitable arms, said series arranged diagonally around said axis, as hereinafter fully shown and described.

In the drawing, Figure 1 represents a side view of a straw-cutter embodying my invention. Fig. 2 represents a detached view of the axle with knives attached. Fig. 3 is a sectional view of a tooth, arm, and axle, through $x\ x$ of Fig. 2. Fig. 4 is a front view of one of the knives.

A represents the frame of the machine. B is an axle, of suitable material and requisite strength. It is suitably journaled in the frame of the machine, and is provided at one end with a balance-wheel, C, and at the other with a pinion, D, which meshes with a cog-wheel, E, to which the power is applied.

The cutting knife or device consists of a series of teeth, G, formed of plates of steel, sharpened on their two edges $g$ and $g'$, and shaped as shown in Figs. 2 and 3. These teeth are fastened to a bar, H, which latter is carried by two rods, I, rigidly secured to the axle or shaft B. Said teeth may be secured to the bar H by rivets or screws, or in any other effective manner. Each tooth may be constructed to be independently attached to the bar H, as indicated in the drawing, or the teeth may be formed out of one plate of steel or metal; but the former method is preferable, as each tooth can be attached and detached without disturbing its neighbors, and the cutting-edges can be more easily sharpened when necessary.

The bar H is suitably curved, so as to correspond with the curve of the fragment of a cylinder taken diagonally across its cylindrical surface. Said bar may be of a greater or less width, and may be cut out on one side to correspond somewhat with the shape of the teeth, as indicated by the dotted lines in Fig. 2, so as to strengthen the teeth throughout the greater part of their length. N are arms, which are firmly secured at one end to the shaft B, and at the other end to the back of the teeth near the points of the same. Each tooth requires one arm, and they are secured to each other by screws, rivets, or in any other effectual manner. These arms, of course, project from the shaft in different directions, to correspond with the different positions of the teeth.

The operation of the device is as follows: The crank of the cog-wheel E is turned in the direction of the arrow, which causes the pinion, and consequently the shaft B and the cutting-knives G, to revolve in the opposite direction. The straw to be cut is fed forward between the feeding-rollers R R' on the surface of the feeding-table, and the cutting device is so placed with reference to the front edge of the feeding-table that it revolves very close to the same, as indicated in Fig. 1. As the cutting device revolves and the straw is fed forward, a portion thereof is first cut by the cutting-edges of $G^1\ G^2$ contiguous to each other. A second portion is cut by the edges of teeth $G^2\ G^3$ contiguous to each other, and so on, according to the number of teeth arranged on the shaft, which may, of course, be a greater or less number than represented in the drawing. The cutting device revolves rapidly, and cuts the straw easily and effectually.

It will be observed that by making the cutting-blade serrated, as described, the straw is seized between the two cutting-edges $g$ and $g'$, respectively formed on each of the adjoining serrations, and is thereby subjected to a double cutting process. These two independent cuts—one on either side of the straw—meet in the center, and serve to sever the straw quickly, easily, and in a manner far superior to that accomplished were the cutting-knife formed with a plain edge, as has heretofore been the case in blades curved angularly upon their driving-shafts.

What I claim is—

1. In a straw-cutter, a serrated knife or cutter curved to correspond with the surface of the section of a cylinder taken diagonally across its axis, said knife suitably attached to a shaft, substantially as and for the purpose described.

2. In a straw-cutter, a serrated knife or cutter curved to correspond with the surface of the section of a cylinder taken diagonally across its axis, the cutting-edges of the knife diverging equally from a vertical plane at right angles to the axis of the shaft to which said knife is suitably attached, substantially as and for the purpose described.

3. In a straw-cutter, a serrated knife or cutter curved to correspond with the surface of the section of a cylinder taken diagonally across its axis, in combination with bar H, rods I, arms N, and shaft B, substantially as and for the purpose described.

In testimony whereof I have signed my name to this specification in the presence of two subscribing witnesses.

WILLIAM KACHIN.

Witnesses:
FRANCIS TOUMEY,
W. E. DONNELLY.